Patented Aug. 30, 1938

2,128,433

UNITED STATES PATENT OFFICE 2,128,433

INSECTICIDAL COMPOSITION

Erik Rotheim, Oslo, Norway

No Drawing. Application January 12, 1933, Serial No. 651,447. In Norway January 13, 1932

2 Claims. (Cl. 167—13)

This invention relates to materials of the type which permit application in the form of a spray consisting of particles of a greater or less size. Materials of this type are for example insecticidal compositions and the like.

More particularly the invention is concerned with materials of the type indicated, which contain considerable quantities of liquid or solid hydrocarbons or hydrocarbon compounds as an active constituent or as a solvent or diluent for the active constituent. It is known to prepare such materials for spraying by dissolving in same a liquefied gas which expands in the course of the spraying operation and converts the material into a dispersion of liquid or solid material in a flow of the expanded gas. I have previously suggested for this purpose dimethylether and other hydrocarbon derivatives boiling between 0° C. and —20° C.

The present invention is based on the discovery that a more efficient and uniform atomization of the material can be obtained with a comparatively small proportion of the gaseous pressure and atomizing agent when the said agent consists of or contains hydrocarbon gases with a considerably lower condensation temperature (and considerably higher condensation pressures) than those of the gases hitherto proposed for the same purpose.

In accordance with this observation the present invention has for its object to incorporate a proportion of hydrocarbon gases with boiling points below —20° C. into the materials to be prepared for spraying. According to the invention the proportion of such low-boiling hydrocarbons introduced into the material is so adjusted as to produce a pressure which is much lower than the condensation pressure of the introduced hydrocarbon gas or mixture of hydrocarbon gases.

As examples of low-boiling hydrocarbons suitable for the purpose may be mentioned propane, propylene, ethylene, ethane, methane etc.

By the use of for example propane alone as a pressure agent a material prepared for atomization—for instance an insecticide with petroleum as a solvent or vehicle—may be produced by passing propane from a steel flask containing liquefied propane into a closed pressure-resistant vessel containing the said insecticide composition until so much propane has been dissolved therein that the pressure in the last named container has been raised to about 4 atmospheres (at 15° C.). The composition is then ready for ejection and atomization. It has been found that the quantity of gas so incorporated into the material is sufficient to eject the entire quantity of the material from the closed vessel under a practically constant pressure and to effect efficient and uniform atomization of the ejected material.

When other hydrocarbon gases or gas mixtures are to be employed as a pressure agent, the preparation of the material may be effected in substantially the same manner as in the above example.

When—as in the described example—propane or other gaseous hydrocarbon dissolved in hydrocarbon oils (petroleum) or similar liquid containing several substances with different boiling points is used the evaporation of the propane in the moment of ejection and atomization will be accompanied by evaporation of small quantities of the more volatile components of the petroleum which will modify the vapour tension and other properties of the propane and consequently also the disintegrating effect of the gas during the evaporation and expansion.

As already mentioned the gaseous pressure and atomizing agent introduced into the material to be prepared for spraying may consist of a single hydrocarbon compound such as for example propane alone, or also of a mixture of gaseous hydrocarbon compounds. It has been found, however, that in most instances the best results are obtained when the prepared material contains two or more gaseous hydrocarbon compounds having widely different boiling points. This is particularly the case when the materials in question contain substances in colloidal solution or highly viscid constituents such as resins, caoutchouc, linoxyn, coal-tar pitch and the like. In connection with materials of this type the presence of small quantities of low-boiling hydrocarbons together with hydrocarbons with substantially higher boiling points promotes and accelerates the disintegration of the material in the moment of ejection.

Instead of mixtures of particularly low-boiling hydrocarbons with higher-boiling hydrocarbons it will sometimes be of advantage to employ mixtures of hydrocarbon gases with gaseous hydrocarbon derivatives (such as ethers, esters or halogenated hydrocarbons) with relatively high boiling points, in that it is possible in this way to modify the dissolving and disintegrating properties of the gas mixture in accordance with the character of the material to be sprayed.

As examples of suitable gas mixtures the following may be mentioned:

Butane+ethane.
Natural gas fractions boiling between −20° C. and −100° C.
Crack-gas fractions boiling between −20° C. and −100° C.
Refinery gases boiling between −20° C. and −100° C.
"Blaugas" or fractions of same.
Coalgas fractions boiling between −20° C. and −100° C.
"Pintschgas" or fractions thereof.
Propane+methyl chloride.
Ethane+dimethylether.
Isobutane+methylnitrite+ethane.
Ethane + propylene + isobutane + methylchloride.
Propane+normal butane.
Propane+methane.
Methane+normal butane.

The use of a small percentage (for example between 1 and 10 percent) of a very low-boiling gas (for example methane) together with a relatively high-boiling gas (for example normal butane) has been found to present several advantages besides the above mentioned decrease in the quantity of gas required to effect complete ejection and disintegration of the material.

One important advantage of the addition of a very low-boiling gas consists in counteracting the bad effect of supersaturation phenomena, in that the presence of the low-boiling gas promotes and accelerates the release of supersaturations of dissolved gas at the moment of expulsion. If a single hydrocarbon gas having a condensation pressure in the neighborhood of the working pressure of the atomizing operation is used, it may happen that the condition of supersaturation of the gas in the material which occurs prior to the formation of gas bubbles in the material will be released too late for example only after the material has left the exit opening of the spray nozzle employed.

Such delayed release of the supersaturation and consequent expansion of gas has been found to result in the formation of an inhomogeneous spray in which the particles differ greatly in size, and which is therefore not suitable for practical purposes.

When the material is prepared according to the present invention the conversion of the material into a uniform dispersion of particles of non-gaseous material in a flow of compressed gas before it reaches the exit opening of the spray nozzle is ensured.

I claim:

1. An insecticide adapted to be applied in the form of a spray containing minute drops comprising a volatile material capable of dissolving fats, waxes and the like and liquid at ordinary temperature and pressure together with a normally gaseous material comprising essentially a hydrocarbon having a boiling point below minus 20° C. under ordinary conditions, the said gaseous material being dissolved in the liquid in a quantity sufficient to saturate the liquid with gas under a pressure of several atmospheres at normal temperature and an additional small percentage of a gaseous hydrocarbon having a considerably lower boiling point than said first mentioned hydrocarbon.

2. An insecticide adapted to be applied in the form of a spray containing minute drops comprising a normally liquid vehicle capable of dissolving fats, waxes and the like and a dissolving gaseous material comprising essentially propane dissolved in the vehicle in a quantity sufficient to saturate the said vehicle with gas under a pressure of several atmospheres at normal temperature and in addition a small percentage of methane.

ERIK ROTHEIM.